United States Patent [19]

Zumbusch

[11] Patent Number: 4,491,332
[45] Date of Patent: Jan. 1, 1985

[54] SHAFT SEAL AND MEANS TO EFFECT RADIAL MOVEMENT OF SEALING LIP

[75] Inventor: Steven J. Zumbusch, Eden Prairie, Minn.

[73] Assignee: Eaton Corporation, Cleveland, Ohio

[21] Appl. No.: 549,053

[22] Filed: Nov. 7, 1983

[51] Int. Cl.³ ............................................... F16J 15/32
[52] U.S. Cl. .................................... 277/152; 277/166; 277/188 A
[58] Field of Search .................... 277/35, 50, 152, 153, 277/165, 166, 188 R, 188 A

[56] References Cited

U.S. PATENT DOCUMENTS

| | | | |
|---|---|---|---|
| 2,483,988 | 10/1949 | Victor | 277/50 |
| 2,485,011 | 10/1949 | Niessen et al. | 277/50 |
| 3,489,420 | 1/1970 | Woodling | 277/37 |
| 3,495,843 | 2/1970 | Andersen et al. | 277/188 R X |
| 3,601,419 | 8/1971 | Fern | 277/205 |
| 4,325,591 | 4/1982 | Otto | 277/50 X |

FOREIGN PATENT DOCUMENTS

| | | | |
|---|---|---|---|
| 2643229 | 3/1978 | Fed. Rep. of Germany | 277/153 |
| 1321889 | 2/1963 | France | 277/152 |

Primary Examiner—Robert S. Ward
Attorney, Agent, or Firm—C. H. Grace; L. J. Kasper

[57] ABSTRACT

A shaft seal assembly (55) for use in a rotary fluid pressure device. The device includes a housing (51) and a rotary shaft (31). The shaft seal assembly (55) includes an elastomeric sealing element (65), an inner support member (67) and an outer support member (69). The sealing element (65) includes a cushion portion (81) disposed radially between the inner and outer support members to cushion radial movement of the inner support member when the shaft moves radially. The sealing element (65) includes a sealing lip (71) defining a pivot point (83) and the inner support member extends rearwardly of the pivot point (83), whereby radial movement of the inner support member results in corresponding radial movement of the sealing lip (71), reducing the loading on the lip.

3 Claims, 5 Drawing Figures

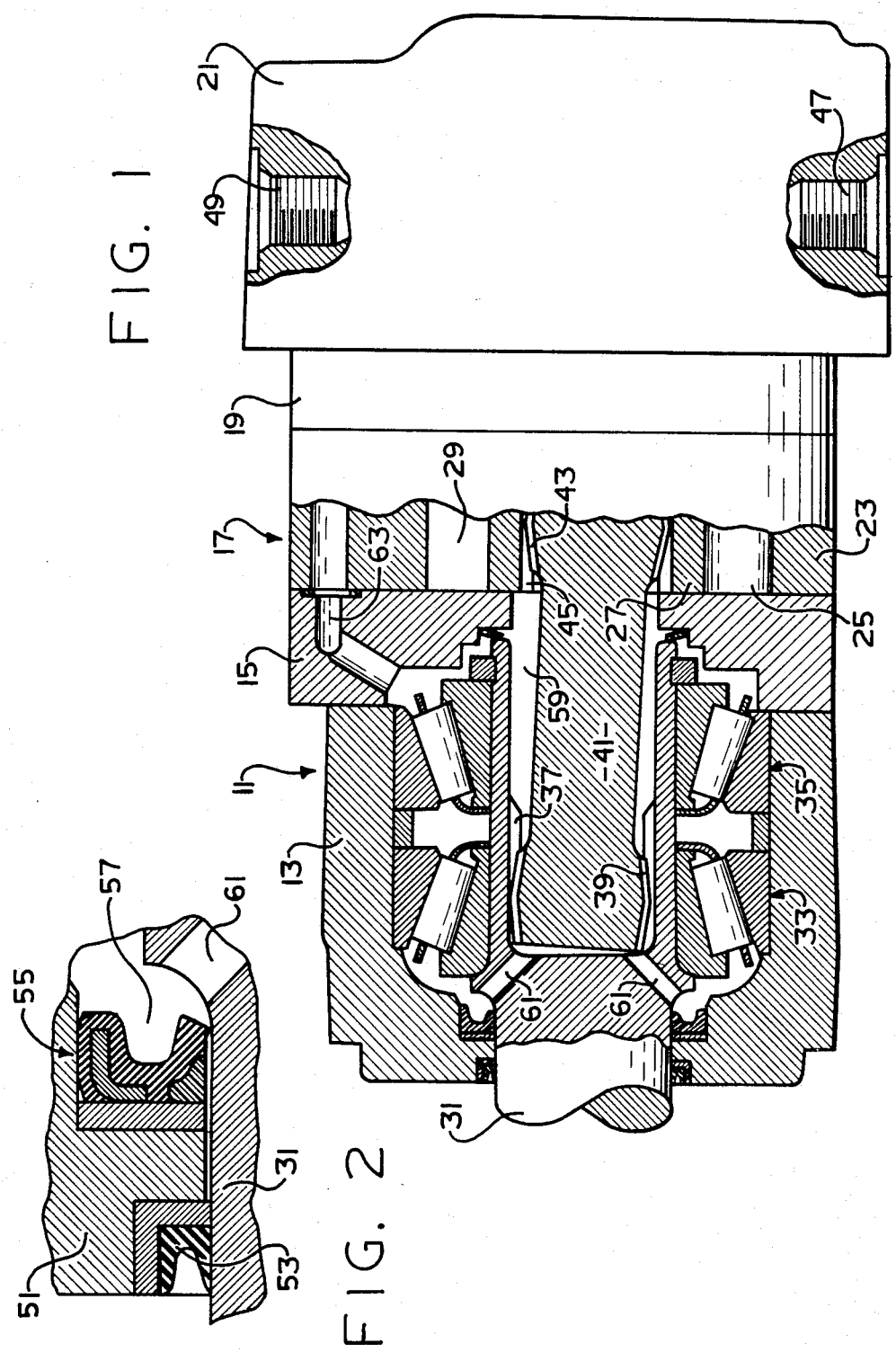

SHAFT SEAL AND MEANS TO EFFECT RADIAL MOVEMENT OF SEALING LIP

BACKGROUND OF THE DISCLOSURE

The present invention relates to rotary fluid pressure devices, and more particularly, to shaft seal assemblies for effecting a fluid seal between the rotary shaft and the housing of such devices.

Although the present invention may be used in many types of rotary fluid pressure devices, it is especially advantageous for use in low-speed, high-torque (LSHT) motors and will be described in connection therewith. In a typical LSHT hydraulic motor, high-pressure fluid is received by the motor, at an inlet port, and the fluid-pressure energy is translated into rotary motion of an output shaft by means of a displacement mechanism, such as a gerotor gear set. Such motors typically include a housing, surrounding the output shaft, and it is necessary to provide a fluid seal between the rotating shaft and the stationary housing to prevent pressurized fluid within the motor case from leaking out of the motor, between the shaft and the housing.

Various shaft seal assemblies have been used in the prior art, including such well known seal configurations as O-rings, quad rings, and various lip seal arrangements. Many of the well known shaft seal arrangements were generally satisfactory as long as the case drain fluid pressure, to which the shaft seal is subjected, is kept fairly low, for example, 50 PSI to 200 PSI. However, as LSHT motors have been improved, in terms of durability and torque-transmitting capacity, the fluid pressures communicated to such motors have gradually been increased, in many cases resulting in substantially greater case drain pressures.

In addition, in certain applications it is desirable to connect several LSHT motors in series, i.e., the outlet port of the first motor is connected to the inlet port of the second motor. Because case drain pressure is typically somewhere between motor inlet pressure and motor outlet pressure, the case drain pressure of the first motor in series may be somewhere in the range of 2,000 PSI, and it is necessary for the shaft seal assembly to be able to withstand such pressures over a period of many hours of operation.

Finally, in certain LSHT motor designs, the shaft seal assembly may be subjected directly to motor inlet pressure, at least in one direction of operation, i.e., in either clockwise or counter-clockwise rotation of the output shaft. In such motor designs, it is necessary for the shaft seal assembly to be able to withstand full motor inlet pressure which is frequently in the range of 3,000 PSI.

It is quite common for LSHT hydraulic motors to have their output shafts subjected to substantial side loading, resulting in radial movement or deflection of the shaft as it rotates. Such deflection is typically in the range of about 0.010 to about 0.030 inches. Such deflection of the output shaft makes it much more difficult to provide a shaft seal which is able to withstand relatively high pressure, and at the same time, continue to seal effectively over a relatively long period of operation. As the output shaft deflects, the result is increased loading of the seal member, at the point of deflection, and such increased loading results in more heat generation, and eventually leads to the seal member becoming brittle and losing its ability to maintain an effective oil seal. The seal may also be unable to follow the shaft deflection and lose contact with the shaft.

SUMMARY OF THE INVENTION

Accordingly, it is an object of the present invention to provide an improved shaft seal assembly for use in applications in which shaft deflection occurs, wherein the shaft seal assembly is able to withstand higher pressures, and for a longer period of operation.

It is a more specific object of the present invention to reduce substantially the early seal failures which result from excessive heat generation by reducing the loading of the sealing element caused by deflection of the shaft and to enable the sealing portion of the seal to follow the shaft and maintain contact.

The above and other objects of the present invention are accomplished by the provision of an improved shaft seal assembly for use in a rotary fluid pressure device of the type including a housing and a rotating shaft surrounded by the housing and extending therefrom in an axially forward direction. The shaft seal assembly is operable to effect a fluid seal between the shaft and the surrounding housing and includes a generally annular elastomeric sealing element which is generally C-shaped in cross-section, opening rearwardly, the sealing element including a sealing lip. The assembly further includes a generally rigid, non-elastomeric annular inner support member which is closely spaced apart from the rotating shaft, substantially all of the inner support member being surrounded by a portion of the elastomeric sealing member. The sealing lip is disposed rearwardly of the inner support member and is configured such that fluid pressure in a chamber rearward of the shaft seal assembly biases the sealing lip toward the shaft. A generally rigid outer support member is disposed to support the portion of the elastomeric sealing element which is in engagement with the housing.

The improved shaft seal assembly is characterized by the inner support member including a forward portion and a rearward portion disposed adjacent the sealing lip. The outer support member includes a radially inwardly extending portion lying in a transverse plane passing through the forward portion of the inner support member. The elastomeric sealing element includes a cushion portion disposed radially between the forward portion of the inner support member and the inwardly extending portion of the outer support member to cushion radial movement of the inner support member resulting from radial deflection of the shaft. A sealing lip of the elastomeric sealing element defines a pivot point, and a rearward portion of the inner support member extends rearwardly of the pivot point, whereby radial movement of the inner support member results in corresponding radial movement of the sealing lip and reduced loading thereof.

BRIEF DESCRIPTION OF THE DRAWINGS

FIG. 1 is a view, partly in axial cross-section, and partly in elevation, of a LSHT gerotor motor of the type to which the present invention may be applied.

FIG. 2 is an enlarged, axial cross-section, similar to FIG. 1, of the shaft seal area of the motor of FIG. 1.

DESCRIPTION OF THE PREFERRED EMBODIMENT

Figure 5:
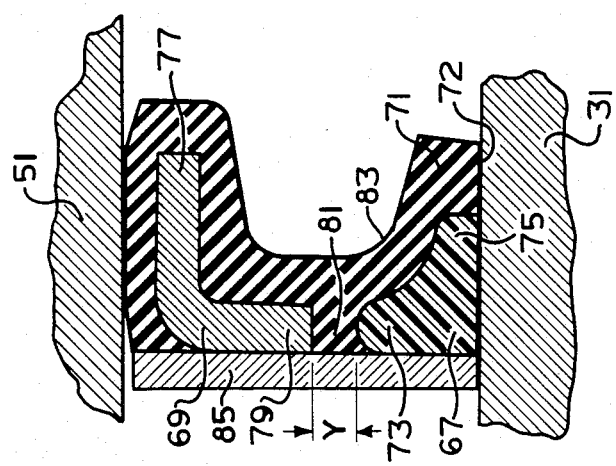
FIG. 5 is an axial cross-section, similar to FIG. 4, but with shaft deflected.

Referring now to the drawings, which are not intended to limit the invention, FIG. 1 illustrates a LSHT gerotor motor of the type to which the present invention may be applied and which is illustrated and described in greater detail in U.S. Pat. Nos. 3,572,983 and 4,343,600, both of which are assigned to the assignee of the present invention and are incorporated herein by reference.

The motor shown in FIG. 1 comprises a plurality of sections secured together, such as by a plurality of bolts (not shown). The motor is generally designated 11 and includes a shaft support casing 13, a wear plate 15, a gerotor displacement mechanism 17, a port plate 19, and a valve housing portion 21.

The gerotor displacement mechanism 17 is well known in the art, is shown and described in great detail in the incorporated patents, and will be described only briefly herein. The mechanism 17 comprises an internally toothed ring 23 defining a plurality of generally semi-cylindrical openings, with a cylindrical member 25 disposed in each of the openings. Eccentrically disposed within the ring 23 is an externally toothed star 27, typically having one less external tooth than the number of members 25, thus permitting the star 27 to orbit and rotate relative to the ring 23. The relative orbital and rotational movement defines a plurality of expanding and contracting fluid volume chambers 29.

Referring still to FIG. 1, the motor includes an output shaft 31 positioned within the shaft support casing 13 and rotatably supported therein by suitable bearing sets 33 and 35. The shaft includes a set of internal, straight splines 37, and in engagement therewith is a set of external, crowned splines 39 formed on one end of the main drive shaft 41. Disposed at the opposite end of the main drive shaft 41 is another set of external, crowned splines 43, in engagement with a set of internal, straight splines 45, formed on the inside diameter of the star 27. In the subject embodiment, because the ring 23 includes seven (7) internal teeth and the star 27 includes six (6) external teeth, six (6) orbits of the star 27 result in one (1) complete rotation thereof, and one (1) complete rotation of the main drive shaft 41 and the output shaft 31.

As is well known in the art, disposed within the valve-housing portion 21 is a valving mechanism (not shown) which is operable to control the flow of pressurized fluid from an inlet port 47 to the expanding volume chambers 29, and from the contracting volume chambers 29 to an outlet port 49.

Referring now to FIG. 2, in conjunction with FIG. 1, the forward portion of the motor will be described in some additional detail. Just forward (left in FIGS. 1 and 2) of the bearing set 33, the shaft support casing 13 defines a reduced diameter portion 51, which defines a pair of annular grooves. Disposed within the forward annular groove is an exclusion seal 53, the function of which is to prevent the ingress of dust, water etc. into the motor. Disposed in the rearward annular groove is a shaft seal assembly, generally designated 55, the primary function of which is to prevent the leakage of hydraulic fluid from an annular fluid chamber 57, past the output shaft 31 to the outside of the motor. As is well known in the art, during operation of the motor 11, leakage fluid flows from locations such as between the end faces of the star 27 and wear plate 15 into a central case drain region 59 which surrounds the main drive shaft 41. This leakage fluid is utilized to lubricate the spline connections 43, 45 and 37, 39 and also to lubricate the bearing sets 33 and 35. Fluid to lubricate the bearing sets flows from the case drain region 59 through a plurality of angled bores 61, defined by the output shaft 31, into the fluid chamber 57, and from there through the bearing sets 33 and 35, and then through a plurality of passages 63 to the outlet port 49.

SHAFT SEAL ASSEMBLY

Figure 3:
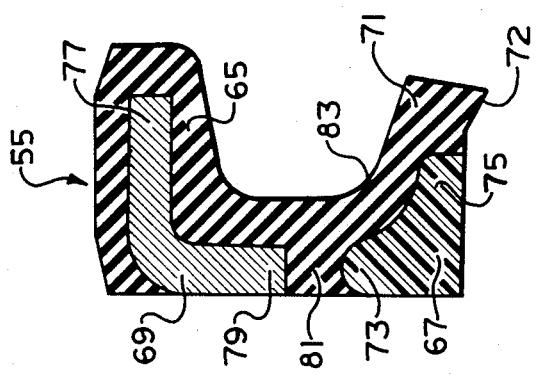
FIG. 3 is an axial cross-section of the shaft seal assembly of the present invention in the disassembled condition.

Referring now to FIG. 3, the structure of the shaft seal assembly 55 will be described, with the operation to be described subsequently in connection with FIGS. 4 and 5. It should be noted that in FIG. 3, the shaft seal assembly 55 is shown in its disassembled condition, with no compressive forces being applied. The shaft seal assembly 55 comprises three (3) primary elements: an elastomeric sealing element 65, an inner support member (heel) 67, and an outer support member (cage) 69.

The elastomeric sealing element 65 comprises a generally C-shaped member, preferably made from any of the materials normally used for fabricating seals, such as natural or synthetic rubber, or an organic compound such as nitrile. The sealing element 65 includes a sealing lip 71 which is sized to have an inner peripheral portion 72 in an interference fit relationship with the OD of the shaft 31.

The heel 67 is generally triangular in shape, and includes a forward portion 73 and a rearward portion 75. Preferably, the heel 67 is fabricated from a rigid, non-elastomeric material such as a rigid plastic or a bronze, having a low coefficient of friction, which is able to be in rubbing engagement with the shaft without causing substantial detriment to either the shaft or the heel.

The cage member 69 is generally L-shaped in cross section, including an outer, cylindrical portion 77 and a radially-inwardly extending portion 79. The cage 69 is preferably fabricated from steel or some other metal or other rigid material and should be molded or bonded to the sealing element 65 so that the element 65 does not turn, relative to the cage 69. A primary function of the cage 69 is to support the radially-outer portion of the sealing element 65. As may best be seen in FIG. 4, the support provided by the cage 69 helps to maintain an interference fit relationship between the OD of the sealing element 65 and the ID of the reduced diameter portion 51.

Referring still primarily to FIG. 3, it is one important feature of the present invention that the inwardly-extending portion 79 of the cage 69 lies in a transverse plane passing through the forward portion 73 of the heel 67. The sealing element 65 includes a cushion portion 81 disposed radially between the forward portion 73 of the heel 67 and the inwardly-extending portion 79 of the cage 69. The function of the cushion portion 81 will be described subsequently in connection with FIG. 5.

The sealing lip 71 of the sealing element 65 defines a pivot point 83, i.e., a point about which the sealing lip 71 would pivot or flex, relative to the rest of the element 65, if the lip 71 were not supported by the heel 67. It is another important feature of the present invention that the rearward portion 75 of the heel 67 extends axially rearward of the pivot point 83, such that at least a portion of the rearward portion 75 is surrounded by at least a portion of the sealing lip 71.

Figure 4:
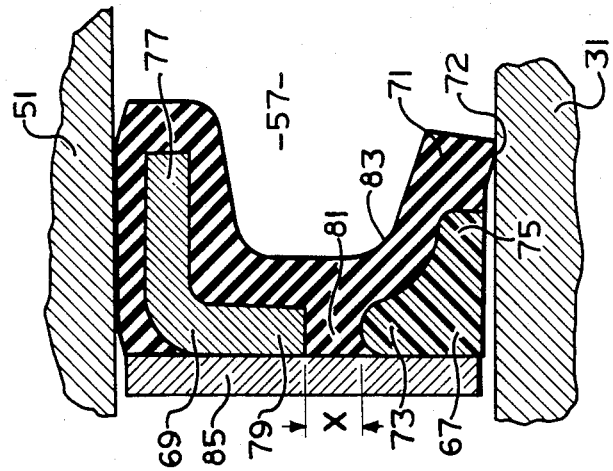
FIG. 4 is an axial cross-section, similar to FIG. 3, but with the shaft seal assembled and the shaft in its normal position.

Referring now primarily to FIG. 4, it may be seen that when the shaft seal assembly 55 of the present invention is assembled within the motor, a backup ring member 85 is inserted between the shaft seal assembly 55 and the reduced diameter portion 51. The primary function of the backup ring 85 is to prevent extrusion of any part of the heel area, as is generally well known in the art. It may also be seen in FIG. 4 that, as mentioned previously, the inner peripheral portion 72 of the sealing lip 71 is in an interference fit relationship with the OD of the output shaft 31. However, it is a feature of the present invention that the axial extent of engagement between the sealing lip 71 and shaft 31 is relatively short, rather than relying upon a relatively long axial extent of engagement to maintain proper sealing and to take up radial movement of the shaft.

It is preferred that the ID of the heel 67 be sized, relative to the OD of the shaft 31, to permit somewhere in the range of about 0.002 to about 0.005 inches of radial shaft movement (deflection), without engagement occurring between the shaft 31 and heel 67. It should be noted that in FIG. 4, which is intended to illustrate the normal or centered position of the shaft 31, the radial clearance between the shaft and the ID of the heel 67 is somewhat exaggerated, merely for the purpose of illustration.

Referring now to FIG. 5, the functioning of the shaft seal assembly 55 of the invention will be described. In connection with FIG. 5, it will now be assumed that the shaft 31 has been subjected to sufficient sideloading to move it radially a distance greater than the designed radial clearance between the OD of the shaft 31 and the ID of the heel 67, as illustrated in FIG. 4. Such radial movement of the shaft results in engagement between the shaft and the ID of the heel, as shown in FIG. 5, at one circumferential location on the heel 67. The engagement of the shaft and heel results in radial movement of the heel relative to the cage 69 and sealing element 65 (i.e., upward in FIG. 5).

When such movement of the heel 67 occurs, the cushion portion 81 of the sealing element 65 is compressed, such that the radial distance between the heel 67 and cage 69 is the distance Y, shown in FIG. 5. By comparison, with the shaft in the normal, centered position, as shown in FIG. 4, in which the radial distance between the heel and the cage is the distance X, wherein X is somewhat greater than Y. The difference (X-Y) represents the amount of compression of the cushion portion 81, and also the amount of radial movement of the heel 67.

Therefore, one function of the cushion portion 81 is to cushion radial movement of the heel 67 relative to the cage 69. Another function of the cushion portion 81 is to prevent extrusion and rupture of the elastomer comprising the sealing element 65, i.e., if the cushion portion were absent, and a space existed between the heel 67 and cage 69, the relatively higher fluid pressure would extrude or push the elastomer of the sealing element 65 into such a space, possibly rupturing the elastomer.

Another important aspect of the present invention is the relationship between the heel 67 and the sealing lip 71. Because the rearward portion 75 of the heel 67 extends rearwardly of the pivot point 83, defined by the sealing lip 71, radial movement of the heel 67 in response to radial movement of the shaft 31 will result in radial movement of the sealing lip 71. As the sealing lip 71 moves radially with the heel 67, such movement prevents excessive loading by the shaft on the adjacent portion of the inner peripheral portion 72. By reducing such loading which normally results when the shaft moves radially, the wear and heat generation at the portion 72 are also reduced, thus reducing the likelihood of the sealing lip 71 becoming brittle and cracking. Therefore, with the present invention, the relationship of the heel 67 and the sealing lip 71 results in the maintenance of a fairly uniform, predetermined loading on the inner portion 72 of the sealing lip 71. If the shaft 31 is deflected in the opposite direction, the heel 67 will still maintain an interference fit between the sealing lip 71 and the shaft as the heel follows the shaft movement.

Testing of the shaft seal assembly of the present invention was conducted in order to compare its performance with that of the standard, commercially utilized lip seal referenced in the Information Disclosure Statement accompanying this specification. The two primary criteria of performance in evaluating the seals are "mean life" and "mean leakage rate." In testing shaft seals, the "life" of a shaft seal is defined as having ended when the shaft seal is leaking 20 ml. or more of fluid per day.

In conducting this testing, eight (8) samples of the shaft seal assembly of the present invention were assembled into motors, and two (2) of the commercially utilized (prior art) shaft seals were assembled into motors. Each of the motors was operated at a pressure, on the shaft seals, of 2,000 PSI, and at a sufficient flow rate to maintain an output shaft speed of 300 rpm. Under these conditions, the mean life of the eight (8) samples of the invention was 4.6 times longer than the mean life of the two (2) samples of the prior art seal. In addition, the mean leakage rate of the two (2) prior art seals was 3.15 times greater than the mean leakage rate of the eight (8) samples of the invention.

Based upon the foregoing, it may be seen that the present invention provides a substantially improved shaft seal assembly which is able to seal more effectively (lower mean leakage rate) while at the same time having improved durability (higher mean life), as a result of the structural features described hereinabove. The invention has been described in great detail sufficient to enable one skilled in the art to make and use the same. It is believed that upon a reading and understanding of the foregoing specification, various alterations and modifications will become apparent to those skilled in the art, and it is intended to include all such alterations and modifications as part of the invention, in so far as they come within the scope of the appended claims.

I claim:

1. A shaft seal assembly for use in a rotary fluid pressure device of the type including a housing and a rotary shaft surrounded by the housing and extending therefrom in an axially forward direction, said shaft seal assembly being operable to effect a fluid seal between the shaft and the surrounding housing, said shaft seal assembly including a generally annular elastomeric sealing element, being generally C-shaped in cross-section, and opening rearwardly, said sealing element including a sealing lip; a generally rigid, non-elastomeric, annular inner support member closely spaced apart from the rotating shaft, substantially all of said inner support member being surrounded by a portion of said elastomeric sealing member, said sealing lip being disposed generally rearwardly of said inner support member and configured such that fluid pressure in a chamber rearward of said shaft seal assembly biases said sealing lip toward the shaft; and a generally rigid outer support member disposed to support the portion of said elastomeric sealing element in engagement with the housing; said inner support member including a forward portion and a rearward portion disposed adjacent said sealing lip; said outer support member including a radially-inwardly extending portion lying in a transverse plane passing through said forward portion of said inner support member; said elastomeric sealing element including a cushion portion disposed radially between said forward portion of said inner support member and said inwardly-extending portion of said outer support member to cushion radial movement of said inner support member resulting from radial deflection of the shaft characterized by;

(a) said sealing lip of said elastomeric sealing element defining a pivot point, said rearward portion of said inner support member extending rearwardly of said pivot point whereby radial movement of said inner support member results in corresponding radial movement of said sealing lip, and reduced loading thereof.

2. A shaft seal assembly for use in a rotary fluid pressure device of the type including a housing and a rotary shaft surrounded by the housing and extending therefrom in an axially forward direction, said shaft seal assembly being operable to effect a fluid seal between the shaft and the surrounding housing, said shaft seal assembly including a generally annular elastomeric sealing element including a sealing lip; a generally rigid, non-elastomeric, annular inner support member closely spaced apart from the rotating shaft, substantially all of said inner support member being surrounded by a portion of said elastomeric sealing member, said sealing lip being disposed at least partially rearwardly of said inner support member and configured such that fluid pressure in a chamber rearwardly of said shaft seal assembly biases said sealing lip toward the shaft; and a generally rigid outer support member disposed to support the portion of said elastomeric sealing element in engagement with the housing; said inner support member including a forward portion and a rearward portion disposed adjacent said sealing lip; said outer support member including a radially-inwardly extending portion lying in a transverse plane passing through said inner support member; said elastomeric sealing element including a cushion portion disposed radially between said inner support member and said inwardly-extending portion of said outer support member to cushion radial movement of said inner support member resulting from radial deflection of the shaft characterized by;

(a) at least a portion of said sealing lip of said elastomeric sealing element being disposed surrounding said rearward portion of said inner support member, whereby radial movement of said inner support member results in corresponding radial movement of said sealing lip, and reduced loading thereof.

3. A shaft seal assembly as claimed in claim 2 characterized by said annular elastomeric sealing element being generally C-shaped in cross-section and opening rearwardly.

* * * * *